(12) United States Patent
Chapin

(10) Patent No.: US 11,423,008 B2
(45) Date of Patent: Aug. 23, 2022

(54) GENERATING A DATA LINEAGE RECORD TO FACILITATE SOURCE SYSTEM AND DESTINATION SYSTEM MAPPING

(71) Applicant: Capital One Services, LLC, McLean, VA (US)

(72) Inventor: Ann Chapin, Powhatan, VA (US)

(73) Assignee: Capital One Services, LLC, McLean, VA (US)

( * ) Notice: Subject to any disclaimer, the term of this patent is extended or adjusted under 35 U.S.C. 154(b) by 147 days.

(21) Appl. No.: 16/366,652

(22) Filed: Mar. 27, 2019

(65) Prior Publication Data
US 2019/0220458 A1    Jul. 18, 2019

Related U.S. Application Data

(63) Continuation of application No. 15/852,398, filed on Dec. 22, 2017, now Pat. No. 10,331,660.

(51) Int. Cl.
*G06F 16/23*       (2019.01)
*G06F 16/2458*      (2019.01)
(Continued)

(52) U.S. Cl.
CPC ...... *G06F 16/2365* (2019.01); *G06F 16/2465* (2019.01); *G06F 16/256* (2019.01);
(Continued)

(58) Field of Classification Search
CPC ............ G06F 16/2365; G06F 16/2465; G06F 16/256; G06F 16/258; G06F 16/29; G06F 16/215; G06F 11/00
(Continued)

(56) References Cited

U.S. PATENT DOCUMENTS 5,193,185 A    3/1993    Lanter et al.
6,343,295 B1 *   1/2002    MacLeod .............. G06F 16/219
                                                 707/999.102
(Continued)

OTHER PUBLICATIONS

Ab Initio, "Enterprise Mete>Environment", https://www.abinitio.com/en/system/enterprise-metaenvironment, 2006-2016, 9 pages.
(Continued)

*Primary Examiner* — Ashish Thomas
*Assistant Examiner* — Abdullah A Daud
(74) *Attorney, Agent, or Firm* — Harrity & Harrity, LLP

(57) ABSTRACT

A device may generate, in a first data structure of a first system, a data lineage record. The data lineage record may include attributes that are common among a plurality of records of the first data structure. The data lineage record may be used to map the first data structure and a second data structure of a second system. The device may populate the data lineage record with unique values for the attributes. The unique values may be used to identify the attributes of the data lineage record after the data lineage record has been included in the second data structure. The device may provide, from the first system, data included in the first data structure to the second system. The data lineage record may be included in the data provided to the second system. The device may perform an action related to the data provided to the second system.

20 Claims, 6 Drawing Sheets

(51) Int. Cl.
*G06F 16/29* (2019.01)
*G06F 16/25* (2019.01)
*G06F 16/215* (2019.01)

(52) U.S. Cl.
CPC ............ *G06F 16/258* (2019.01); *G06F 16/29* (2019.01); *G06F 16/215* (2019.01)

(58) Field of Classification Search
USPC ........................................................ 707/803
See application file for complete search history.

(56) References Cited

U.S. PATENT DOCUMENTS

| | | | |
|---|---|---|---|
| 6,434,558 B1 | 8/2002 | MacLeod et al. | |
| 6,742,001 B2 | 5/2004 | Ripley et al. | |
| 6,839,714 B2 | 1/2005 | Wheeler et al. | |
| 7,725,433 B1* | 5/2010 | Labrie .................. | G06F 16/213 707/810 |
| 7,725,498 B2* | 5/2010 | Barsness ............... | G06F 16/221 707/809 |
| 7,840,610 B2 | 11/2010 | Chandrasekharan et al. | |
| 8,644,471 B1* | 2/2014 | Peden .................. | H04M 15/06 379/142.04 |
| 8,843,456 B2 | 9/2014 | Christian et al. | |
| 10,157,211 B2 | 12/2018 | Benke et al. | |
| 10,394,691 B1* | 8/2019 | Cole ..................... | G06F 11/079 |
| 10,430,437 B2* | 10/2019 | Purushothaman .... | G06F 16/278 |
| 2004/0193952 A1* | 9/2004 | Narayanan ............ | G06F 16/273 714/13 |
| 2005/0240615 A1* | 10/2005 | Barsness ............. | G06F 16/2456 707/999.102 |
| 2006/0294151 A1 | 12/2006 | Wong et al. | |
| 2007/0266170 A1* | 11/2007 | Mockett ........... | H04N 21/64322 709/231 |
| 2008/0189498 A1* | 8/2008 | Brown ................ | G06F 11/2097 711/162 |
| 2008/0270350 A1 | 10/2008 | Bojanic et al. | |
| 2009/0012983 A1 | 1/2009 | Senneville et al. | |
| 2009/0157802 A1 | 6/2009 | Kang et al. | |
| 2009/0172006 A1 | 7/2009 | Ducaule et al. | |
| 2010/0067335 A1* | 3/2010 | Li ........................ | G06F 11/1464 |
| 2012/0310875 A1 | 12/2012 | Prahlad et al. | |
| 2013/0204841 A1 | 8/2013 | Obusek et al. | |
| 2013/0212351 A1 | 8/2013 | Tkac et al. | |
| 2013/0332423 A1* | 12/2013 | Puri ........................ | G06F 16/35 707/687 |
| 2014/0114907 A1* | 4/2014 | Kozina ................. | G06F 16/283 707/602 |
| 2014/0379665 A1* | 12/2014 | Benjamin .............. | G06Q 40/00 707/769 |
| 2016/0140116 A1* | 5/2016 | Li .......................... | G06F 16/214 707/609 |
| 2016/0364325 A1* | 12/2016 | Ouzzani .............. | G06F 11/3692 |
| 2016/0364434 A1* | 12/2016 | Spitz ..................... | G06F 40/197 |
| 2017/0054790 A1 | 2/2017 | McCubbin et al. | |
| 2017/0155627 A1 | 6/2017 | Goel et al. | |
| 2017/0185622 A1* | 6/2017 | Prah ..................... | G06F 16/182 |
| 2017/0251056 A1 | 8/2017 | Boston et al. | |
| 2017/0270175 A1 | 9/2017 | Bantupalli et al. | |
| 2017/0351728 A1 | 12/2017 | Halberstadt et al. | |
| 2018/0129699 A1* | 5/2018 | Gould ................... | G06F 16/288 |
| 2018/0157702 A1 | 6/2018 | Clemens et al. | |
| 2020/0142781 A1* | 5/2020 | Lee ..................... | G06F 11/3089 |
| 2020/0210427 A1* | 7/2020 | Dugan .............. | G06F 16/24542 |

OTHER PUBLICATIONS

Ab Initio, "Metadata," https://www.abinitio.com/en/architecture/metadata, 2002-2016, 2 pages.
Co-pending U.S. Appl. No. 15/852,398, filed Dec. 22, 2017.
Extended European Search Report for Application No. EP18215164.7, dated Feb. 25, 2019, 9 pages.
Green M., "Metadata Implementation with Ab Initio EME," https://downloads.teradata.com/tools/articles/metadata-implementation-with-ab-initio-eme, May 13, 2009, 5 pages.

* cited by examiner

GENERATING A DATA LINEAGE RECORD TO FACILITATE SOURCE SYSTEM AND DESTINATION SYSTEM MAPPING

RELATED APPLICATION

This application is a continuation of U.S. patent application Ser. No. 15/852,398, filed Dec. 22, 2017, which is incorporated herein by reference.

BACKGROUND

Data lineage of data includes the data's origin, processing performed on the data, where the data moves, and/or the like. Data lineage provides the ability to trace errors in data, to replay portions or inputs of a data flow (e.g., for step-wise debugging or for generating lost output), and/or the like. Data lineage can provide an audit trail of data. Data lineage can be represented visually to show flow/movement of the data from a source to a destination.

SUMMARY

According to some possible implementations, a first system may comprise one or more memories; and one or more processors, communicatively coupled to the one or more memories, to generate, in a first data structure of the first system, a data lineage record. The data lineage record may include attributes that are common among a plurality of records of the first data structure. The data lineage record may be used to map the first data structure and a second data structure of a second system. The one or more processors may populate the data lineage record with unique values for the attributes of the data lineage record. The unique values may be used to identify the attributes of the data lineage record after the data lineage record has been included in the second data structure. The one or more processors may provide, from the first system, data included in the first data structure to the second system to cause the data to be included in the second data structure of the second system. The data lineage record may be included in the data provided to the second system. The one or more processors may perform an action related to the data provided to the second system using the data lineage record.

According to some possible implementations, a non-transitory computer-readable medium may store one or more instructions that, when executed by one or more processors, cause the one or more processors to generate, in a first data structure of a first system, a data lineage record. The data lineage record may include attributes that are common among a plurality of records of the first data structure. The one or more instructions, when executed by the one or more processors, may cause the one or more processors to populate the data lineage record with values for the attributes of the data lineage record. A first value for a first attribute may be different than a second value for a second attribute. The first attribute and the second attribute may be different. The one or more instructions, when executed by the one or more processors, may cause the one or more processors to provide, from the first system, the data lineage record and data included in the first data structure to the second system to facilitate inclusion of the data lineage record and the data in a second data structure of a second system.

The one or more instructions, when executed by the one or more processors, may cause the one or more processors to receive, from the second system, information identifying a manner in which the data lineage record was included in the second data structure. The one or more instructions, when executed by the one or more processors, may cause the one or more processors to map the first data structure and the second data structure based on the information identifying the manner in which the data lineage record was included in the second data structure. The one or more instructions, when executed by the one or more processors, may cause the one or more processors to perform an action related to the data after mapping the first data structure and the second data structure.

According to some possible implementations, a method may include generating, by a first system, a data lineage record in a first data structure of the first system. The first system may be a source of data provided toward a second system. The data lineage record may include attributes that are common among a plurality of records of the first data structure. The method may include populating, by the first system, the data lineage record with unique values for the attributes of the data lineage record. The unique values may be used to identify the attributes of the data lineage record after the data lineage record has been included in a second data structure of the second system. The method may include providing, by the first system and from the first system, data included in the first data structure to the second system to facilitate inclusion of the data in the second data structure of the second system. The data lineage record may be included in the data provided to the second system. The method may include determining, by the first system, a manner in which the data provided toward the second system was included in the second data structure by the second system using the data lineage record. The method may include performing, by the first system, an action related to the data provided toward the second system after determining the manner in which the data was provided toward the second system.

DETAILED DESCRIPTION

The following detailed description of example implementations refers to the accompanying drawings. The same reference numbers in different drawings may identify the same or similar elements.

Systems exchange data among each other and may store the data in a data structure. Each system might be configured to use a data structure with differently named attributes, to use differently formatted data, to combine data from a first system with data from a second system, to arrange data in a data structure differently, and/or the like. This can prevent, and/or increase a difficulty of, mapping data from a first system that has been stored by a second system. Some techniques include generating (either manually or automatically) documentation that identifies a mapping between attributes of a first data structure in a first system and attributes of a second data structure in a second system. However, these techniques need a significant amount of time to generate the mapping and may be inaccurate. In addition, other techniques include analyzing program code related to a set of systems to identify a mapping of data structures in different systems. These techniques, however, may be highly inaccurate as program code related to moving data among systems and/or related to processing data may vary significantly among systems.

Some implementations, described herein, provide a system that is capable of generating a data lineage record that includes values that are unique to other records in the same data structure and/or records in another data structure of another system. In this way, the system facilitates source system and destination system mapping of data (e.g., by facilitating mapping of the unique values in a first system and the unique values in a second system). This improves an accuracy of mapping data among multiple systems, by using unique values that can be tracked as the unique values are moved among the multiple systems. In addition, this reduces an amount of time needed to map data among multiple systems by providing a quick and easy way for data to be tracked and/or mapped among the multiple systems. Further, this conserves processing resources associated with mapping data among multiple systems, by reducing an amount of processing needed to map data among the multiple systems.

Figure 1:
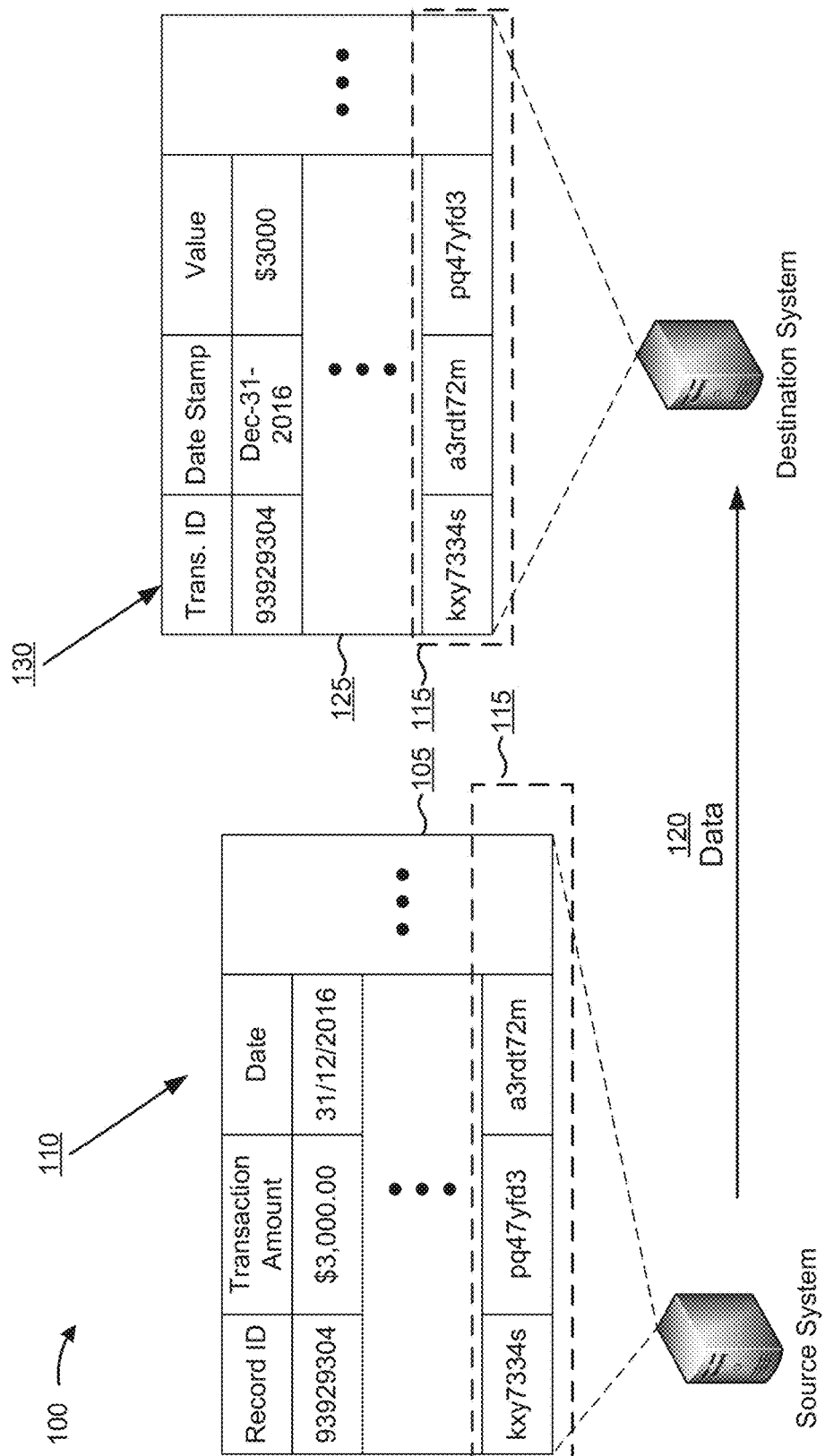
FIG. 1 is a diagram of an overview of an example implementation described herein.

FIG. 1 is a diagram of an overview of an example implementation 100 described herein. As shown in FIG. 1, implementation 100 includes a source system and a destination system.

As shown by reference number 105, the source system may store data (e.g., in a data structure that includes one or more records). For example, and as shown by reference number 110, a record of the data may include values for attributes of the record, such as a record identifier that identifies a record in the data structure, a transaction amount related to a transaction, a date of a transaction, and/or the like. Although the term "data structure" is used herein, the implementations apply equally to a database, a data store, a spreadsheet, and/or the like. As further shown by reference number 110, the attributes may have particular identifiers or names (shown as "Record ID," "Transaction Amount," and "Date"). Additionally, or alternatively, the attributes may be ordered in a particular manner in the data structure, have a particular formatting, and/or the like.

As shown by reference number 115, the source system may generate, in the data structure, a data lineage record. As further shown by reference number 115, the data lineage record may include unique values for each of the attributes of the record. For example, the values for the attributes may be different than any other values in the data structure. This facilitates mapping of data from the source system when stored by the destination system as the unique values can be quickly and easily identified (e.g., based on being present in a data structure associated with the destination system, based on processing program code that populated a data structure associated with the destination system, etc.).

In addition, the values shown with respect to reference number 115 are of a different value type than the corresponding attributes for the values. For example, the value "pq47yfd3" for the "Transaction Amount" attribute is not a dollar value. If attributes of the source system and/or the destination system were strictly typed, then the value type of the values in the data lineage record would need to match the value type of the corresponding attributes. For example, the unique value in the data lineage record for the "Transaction Amount" attribute would need to be a unique dollar value, such as a prime number dollar amount, a negative dollar amount, a dollar amount that is significantly higher than what would occur in the data structure, and/or the like.

As shown by reference number 120, the source system may provide data to the destination system. For example, the source system may provide one or more records of the data structure shown with respect to reference number 105 to the destination system. The source system may provide the data lineage record (e.g., shown by reference number 115) with the data provided to the destination system. By providing the data lineage record to the destination system, the source system can determine a manner in which data from the source system is included in a data structure associated with the destination system, thereby facilitating mapping of the data from the source system and data stored by the destination system.

As shown by reference number 125, data from the source system may be stored in a data structure associated with the destination system. For example, the one or more records from the data structure associated with the source system, including the data lineage record, may be included in the data structure associated with the destination system. As shown by reference number 130, the data structure associated with the destination system may include attributes with different identifiers than the data structure associated with the source system, differently formatted values for attributes than the data structure associated with the source system, differently arranged attributes than the data structure associated with the source system, and/or the like. Additionally, or alternatively, although not shown in FIG. 1, the data structure associated with the destination system may include aggregated attributes from another data structure (e.g., of the source system and/or another system).

Additionally, or alternatively, the data structure associated with the destination system may have different attributes than the data structure associated with the source system, may use different formats for data than the data structure associated with the source system (e.g., a day-month-year format compared to a month-day-year format for a date value), may have differently arranged values than the data structure associated with the source system, and/or the like. Additionally, or alternatively, the data may have been transformed between the source system and the destination system. For example, data elements of the data may have been modified, may have been removed from the data, and/or the like.

As further shown by reference number 130, the data lineage record has been included in the data structure associated with the destination system. The data lineage record may have experienced the same changes as the other data from the data structure associated with the source system. This facilitates determination of modifications to other data from the source system as the modifications can be determined using original known unique values of the data lineage record.

As shown by reference number 135, the source system may map data stored by the source system and data stored by the destination system (e.g., after receiving the data stored by the destination system). The source system may match values of the data lineage record stored by the source system and values of the data lineage record stored by the destination system and may identify corresponding attributes of the data structure associated with the source system and the data structure associated with the destination system. In this way, the source system may map attributes of the data structure associated with the source system and attributes of the data structure associated with the destination system.

Additionally, or alternatively, the source system may process program code to map data. For example, the source system may process the program code to identify values of the data lineage record and corresponding attributes of the data structure associated with the destination system to identify a mapping of data in the data structure associated with the source system and data in the data structure associated with the destination system. Additionally, or alternatively, by processing program code, the source system may easily identify modifications to the data that occurred prior to or after the data was stored in the data structure associated with the destination system. This conserves processing resources of the source system by reducing or eliminating a need for the source system to request data from the destination system to map the data. In addition, this conserves network resources, such as bandwidth, that would otherwise be consumed receiving data from the destination system to facilitate mapping of data in the data structure associated with the source system and the data in the data structure associated with the destination system.

In this way, a system may generate a data lineage record that includes unique values to facilitate source system and destination system mapping. This reduces or eliminates a need to process code to map data in a first data structure and data in a second data structure, thereby conserving processing resources of the system. In addition, this improves an accuracy of mapping data in the first data structure and data in the second data structure, thereby improving a mapping. Further, this reduces an amount of time needed to generate a mapping, thereby improving generation of a mapping.

As indicated above, FIG. 1 is provided merely as an example. Other examples are possible and may differ from what was described with regard to FIG. 1.

Figure 2:
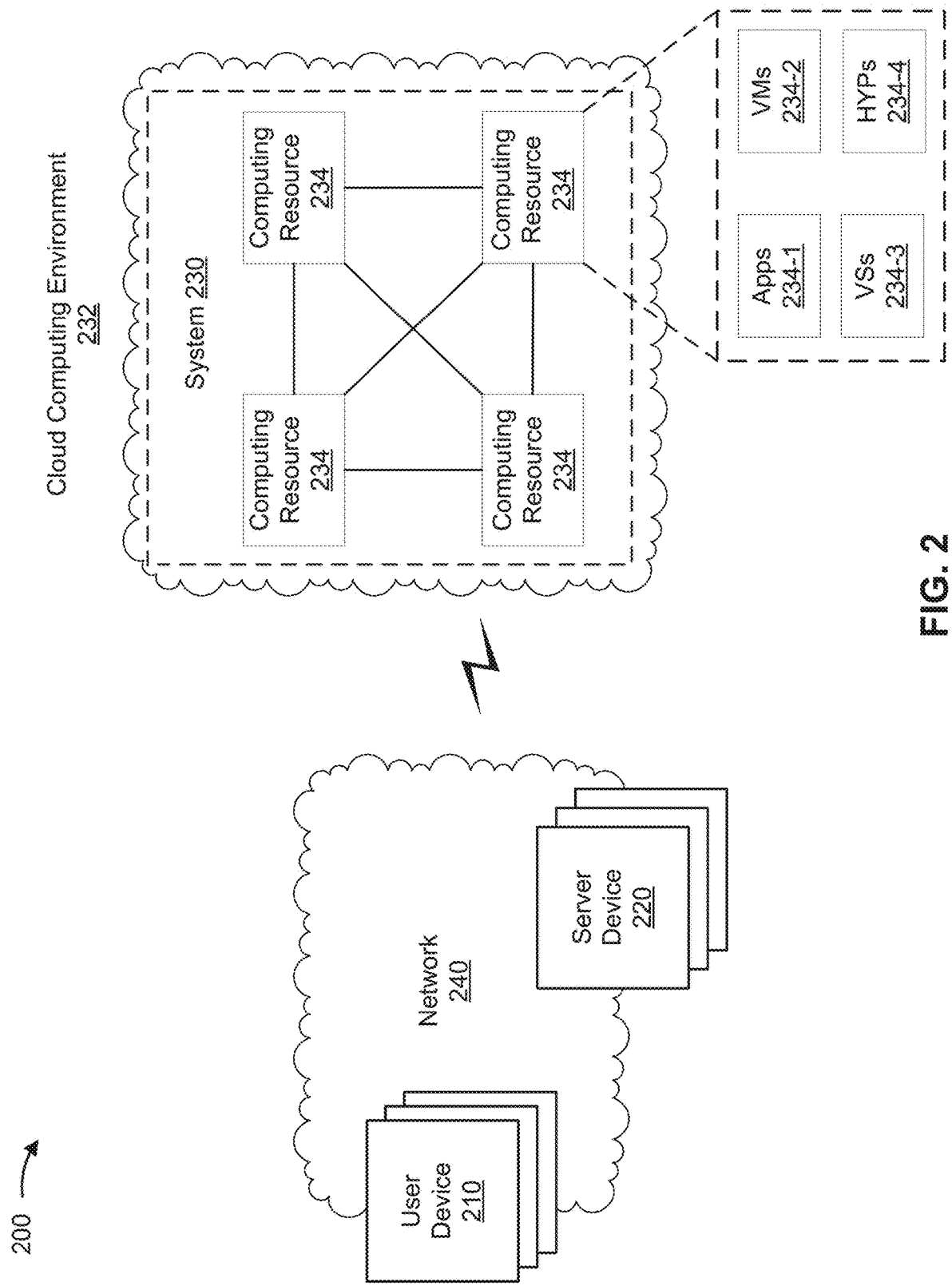
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of user devices 210 (referred to collectively as "user devices 210" and individually as "user device 210"), a set of server devices 220 (referred to collectively as "server devices 220" and individually as "server device 220"), and system 230 provided in cloud computing environment 232 that includes a set of computing resources 234. Devices of environment 200 may interconnect via wired connections, wireless connections, or a combination of wired and wireless connections.

User device 210 includes one or more devices capable of receiving, generating, storing, processing, and/or providing information related to mapping a first data structure stored by a first system 230 and a second data structure stored by a second system 230. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to system 230, input to cause system 230 to map data stored by a first system 230 and data stored by a second system 230, as described elsewhere herein. Additionally, or alternatively, user device 210 may receive, from system 230, a result of a mapping data stored by a first system 230 and data stored by a second system 230 (e.g., for display), as described elsewhere herein.

Server device 220 includes one or more devices capable of receiving, generating, storing, processing, and/or providing information associated with a mapping of data in a first data structure associated with a first system 230 and data in a second data structure associated with a second system 230. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide data to system 230 that system 230 is to use to map data stored by a first system 230 and data stored by a second system 230, as described elsewhere herein. Additionally, or alternatively, server device 220 may store a result of mapping data stored by a first system 230 and data stored by a second system 230, as described elsewhere herein.

System 230 includes one or more devices capable of receiving, generating, storing, processing, and/or providing information associated with a mapping of data stored by a first system 230 and data stored by a second system 230. For example, system 230 may include a cloud server or a group of cloud servers. In some implementations, system 230 may be designed to be modular such that certain software components can be swapped in or out depending on a particular need. As such, system 230 may be easily and/or quickly reconfigured for different uses.

In some implementations, as shown, system 230 may be hosted in cloud computing environment 232. Notably, while implementations described herein describe system 230 as being hosted in cloud computing environment 232, in some implementations, system 230 may not be cloud-based (i.e., may be implemented outside of a cloud computing environment) or may be partially cloud-based.

Cloud computing environment 232 includes an environment that hosts system 230. Cloud computing environment 232 may provide computation, software, data access, storage, and/or other services that do not require end-user knowledge of a physical location and configuration of a system and/or a device that hosts system 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host system 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with system 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
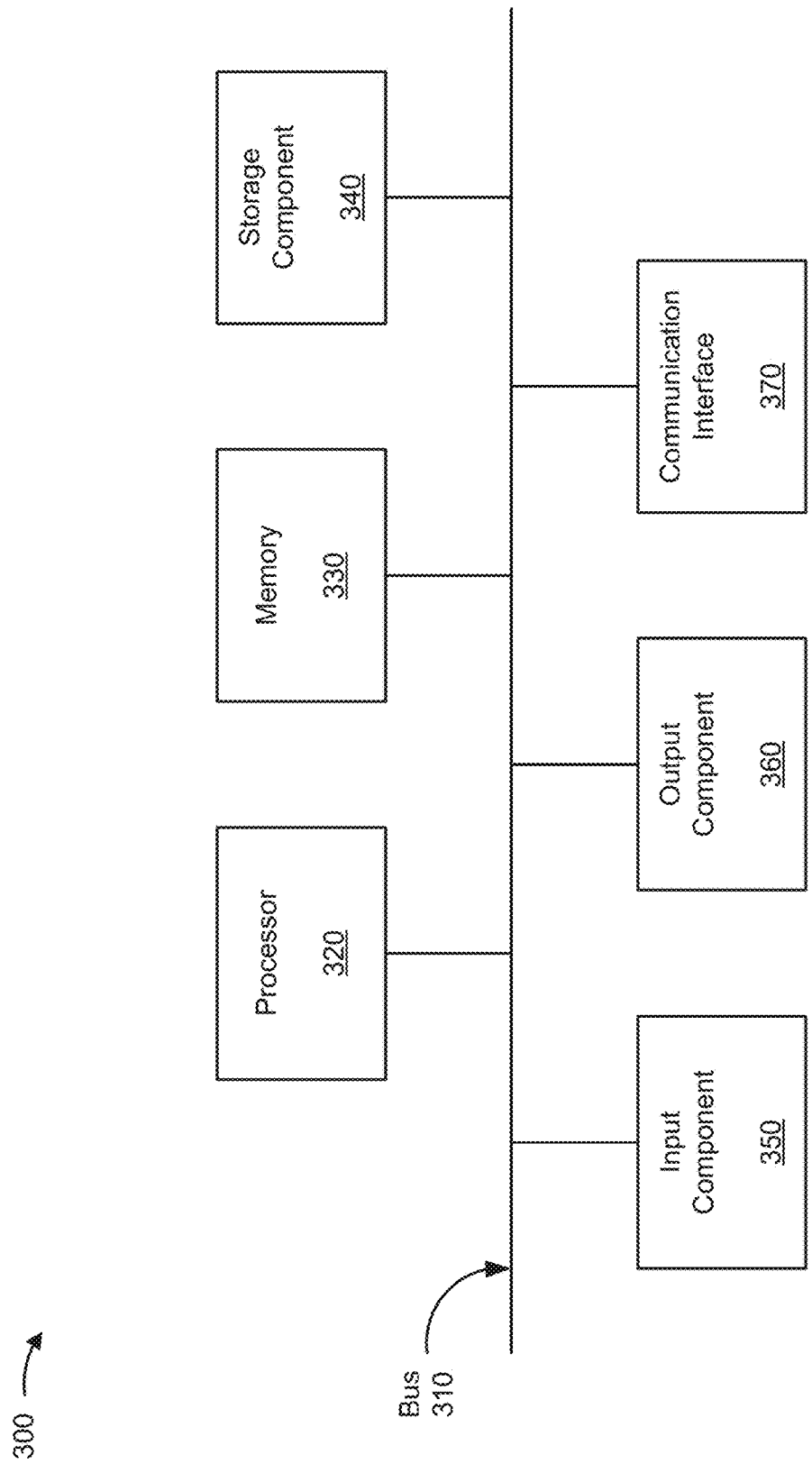
FIG. 3 is a diagram of example components of one or more devices of FIG. 2.

FIG. 3 is a diagram of example components of a device 300. Device 300 may correspond to user device 210, server device 220, system 230, and/or computing resource 234. In some implementations, user device 210, server device 220, system 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
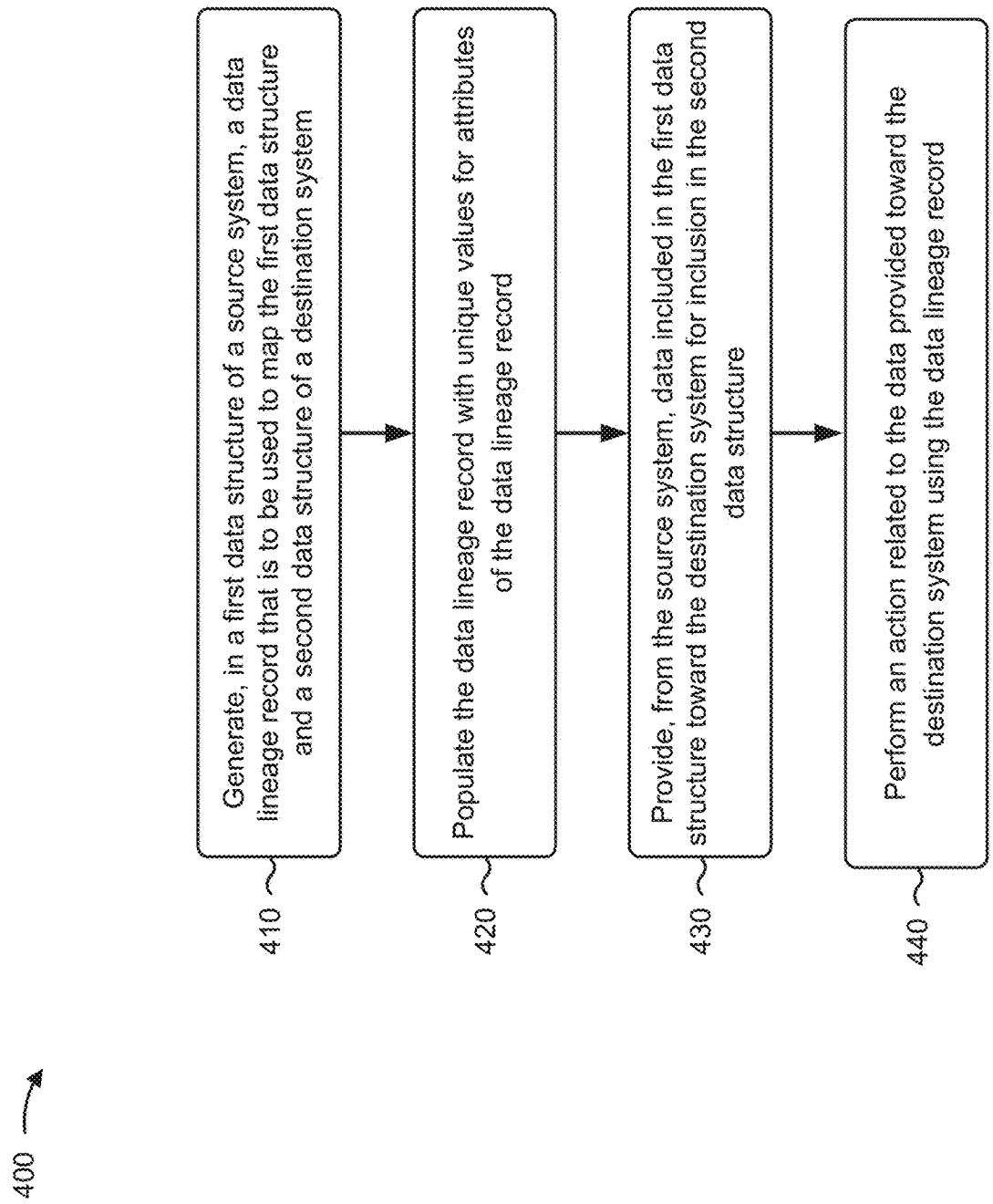
FIG. 4 is a flow chart of an example process for generating a data lineage record to facilitate source system and destination system mapping.

FIG. 4 is a flow chart of an example process 400 for generating a data lineage record to facilitate source system and destination system mapping. In some implementations, one or more process blocks of FIG. 4 may be performed by system 230. In some implementations, one or more process blocks of FIG. 4 may be performed by another device or a group of devices separate from or including system 230, such as user device 210 and server device 220.

As shown in FIG. 4, process 400 may include generating, in a first data structure of a source system, a data lineage record that is to be used to map the first data structure and a second data structure of a destination system (block 410). For example, a source system 230 may generate, in a first data structure of the source system 230, a data lineage record that is to be used to map the first data structure and a second data structure of a destination system 230.

In some implementations, a data lineage record may include attributes (e.g., fields, columns, etc.) that are common among other records of the first data structure. For example, if other records of the first data structure include a record identifier attribute, a date attribute, and an amount attribute, a data lineage record may include one or more of the record identifier attribute, the date attribute, and the amount attribute. In some implementations, a data lineage record may be used to map the first data structure and the second data structure. For example, as described in more detail elsewhere herein, a data lineage record may be provided with data from the first data structure to the second data structure and may include unique values that facilitate mapping of attributes of the first data structure and attributes of the second data structure.

In some implementations, a data lineage record may include an identifier that identifies that the data lineage record is to be used to determine data lineage of data. For example, a data lineage record may include an attribute that is designated for identifying the data lineage record as being associated with determining data lineage. Additionally, or alternatively, the source system 230 may store information that identifies the data lineage record as being associated with determining data lineage. For example, the source system 230 may store in server device 220 an identifier that identifies the data lineage record and information identifying the data lineage record as being associated with determining data lineage. In this way, a data lineage record can be accurately identified among other records of a data structure in which the data lineage record is stored (e.g., to facilitate exclusion of the data lineage record from analyses performed using the other records, from queries of the other records, etc.). This conserves processing resources that would otherwise be consumed due to the data lineage record being unintentionally included in a data set (e.g., computing resources that would be consumed as a result of an error occurring during an analysis that includes the data lineage record).

In some implementations, when generating a data lineage record in the first data structure, the source system 230 may insert the data lineage record into the first data structure. For example, the source system 230 may generate a new record (e.g., a new row, a new entry, etc.) in the first data structure that is to be used as a data linage record (e.g., with the same attributes as other records of the first data structure). In some implementations, after inserting a data lineage record into the first data structure, the source system 230 may insert a new attribute (e.g., a new column, a new field, etc.) into the first data structure. For example, the source system 230 may generate a new attribute to be used to identify that a data lineage record is to be used to facilitate mapping of the first data structure and the second data structure.

In this way, a source system 230 may generate a data lineage record prior to populating the data lineage record.

As further shown in FIG. 4, process 400 may include populating the data lineage record with unique values for attributes of the data lineage record (block 420). For example, the source system 230 may populate the data lineage record with unique values for attributes of the data lineage record. In some implementations, a unique value may include a unique alphanumeric string, a unique numerical value (e.g., a prime number, which reduces a likelihood that the unique value can be computed for another record), a unique date stamp, a unique timestamp, a unique pattern of Boolean values (e.g., a pattern of Boolean values that would not exist in other records), and/or the like.

In some implementations, unique values may be used to identify attributes of a data lineage record after the data lineage record has been included in a data structure (e.g., a data lineage record from the first data structure may be used to identify corresponding attributes of the second data structure when the data lineage record is stored in the second data structure). In some implementations, a unique value for a first attribute may be different than a unique value for a second attribute (e.g., the first attribute and the second attribute may be different). Additionally, or alternatively, a unique value may be different than any other value in the data structure in which the data lineage record was generated and/or to which the data lineage record is destined. For example, a unique value may be a value that would not be included in the data structure, is not possible for the record, and/or the like. As a specific example for a date attribute, a unique value may be a date that is prior to the earliest date of other records in a data structure and/or that does not exist (e.g., a date of February 29 for a year that was not a leap year or a date of February 31 that does not exist).

In some implementations, the source system 230 may generate a unique value by generating at least one of a unique date stamp, a set of unique Boolean values, a unique timestamp, a unique alphanumeric string, and/or a unique numerical value. In some implementations, the source system 230 may populate attributes of a data lineage record with generated unique values.

In some implementations, a unique value that the source system 230 generates may have the same data type as a corresponding attribute for the unique value. For example, if an attribute is configured as an integer data type, then the system 230 may generate a unique value for the attribute that is of an integer data type; if an attributed is configured as a date data type, then the system 230 may generate a unique value for the attribute that is of a date data type; and so on.

In some implementations, when populating attributes of a data lineage record, source system 230 may populate a first attribute with a first unique value and may populate a second attribute with a second unique value. For example, the first attribute and the second attribute may be different.

In this way, source system 230 may populate the data lineage record prior to providing data to a destination system 230.

As further shown in FIG. 4, process 400 may include providing, from the source system, data included in the first data structure to the destination system for inclusion in the second data structure (block 430). For example, source system 230 may provide, from the source system, data included in the first data structure toward the destination system 230 for inclusion in the second data structure. In some implementations, source system 230 may provide data to destination system 230 based on receiving input to provide the data, according to a schedule, periodically, and/or the like.

In some implementations, a data lineage record may be included in data provided from source system 230 toward destination system 230. For example, a data lineage record may be included in data provided from source system 230 to destination system 230 to permit and/or facilitate mapping of a data structure of the source system 230 and a data structure of the destination system 230. Continuing with the previous example, a mapping may be based on a representation of a lineage of data via unique values of the data lineage record. In other words, unique values of a data lineage record may facilitate identification of data lineage of the data lineage record and other records from the same data structure as the data lineage record (e.g., by mapping and/or tracking the unique values).

In some implementations, source system 230 may receive, from destination system 230, information identifying a manner in which a data lineage record was included in a data structure associated with the destination system 230. For example, the information may identify whether all values of the data lineage record were included in the second data structure, whether values of the data lineage record were modified from what source system 230 provided, whether the data structure associated with the destination system 230 includes attributes other than those included in the data lineage record, and/or the like.

In some implementations, source system 230 may map a data structure associated with the source system 230 and a data structure associated with destination system 230. For example, the source system 230 may identify attributes of the first data structure associated with the source system 230 and corresponding attributes of the second data structure associated with the destination system 230.

In some implementations, source system 230 may map a data structure associated with the source system 230 and a data structure associated with destination system 230 based on information identifying a manner in which a data lineage record was included in the data structure associated the destination system 230. For example, the source system 230 may determine a manner in which a data lineage record from the first data structure associated with the source system 230 was included in the second data structure associated with the destination system 230 after mapping the first data structure and the second data structure, as described in more detail elsewhere herein.

In some implementations, source system 230 may perform a comparison of a data lineage record as included in the first data structure associated with the source system 230 and program code that included the data lineage record in the second data structure associated with destination system 230. For example, the source system 230 may identify unique values of the data lineage record and/or attributes of the first data structure in the program code to identify a manner in which the data lineage record was included in the second data structure. In some implementations, source system 230 may map the first data structure and the second data structure based on a result of the comparison.

In some implementations, source system 230 may determine a manner in which data provided toward destination system 230 was included in a data structure associated with the destination system 230 using a data lineage record. For example, the source system 230 may determine a manner in which data provided toward the destination system 230 was included in a data structure associated with the destination system 230 by performing a comparison of the data lineage record as included in the data structure associated with the destination system 230 and the data lineage record as included in a data structure associated with the source system 230.

In some implementations, source system 230 may determine whether an order of attributes of a data lineage record was modified from the first data structure associated with the source system 230 to the second data structure associated with destination system 230 (e.g., by comparing an order of attributes of a data lineage record in a data structure associated with the source system 230 and an order of attributes of the data lineage record in the data structure associated with the destination system 230). Additionally, or alternatively, source system 230 may determine whether a data lineage record in a data structure associated with destination system 230 includes additional attributes not included in another data structure associated with the source system 230 (e.g., by comparing attributes associated with a data lineage record in the data structure associated with the source system 230 and attributes associated with the data lineage record in the data structure associated with the destination system 230).

Additionally, or alternatively, source system 230 may determine whether unique values of a data lineage record in a data structure associated with destination system 230 were modified from unique values of the data lineage record in a data structure associated with the source system 230. For example, the source system 230 may compare values of the data lineage record in the data structure associated with the source system 230 and values of the data lineage record in the data structure associated with the destination system 230 to determine whether the values in the data structure associated with the destination system 230 were modified.

In some implementations, source system 230 may identify data from the first data structure associated with the source system 230 in the second data structure associated with destination system 230 using a data lineage record. For example, the source system 230 may identify unique values of the data lineage record, an identifier of the data lineage record, and/or the like in the data in the second data structure to identify data from the first data structure in the second data structure. This facilitates tracking of the data from the first data structure as the data is aggregated with data from other data structures, is modified from the source system 230 to the destination system 230, and/or the like.

In some implementations, source system 230 may determine whether a mapping of the first data structure associated with the source system 230 and the second data structure associated with destination system 230 is accurate. For example, the mapping may be a prior mapping generated using another technique (e.g., a manual technique, a technique that analyzes program code related to a set of systems 230, etc.). Continuing with the previous example, source system 230 may compare a mapping that the source system 230 generated using a data lineage record and another mapping generated using another technique to determine whether the other mapping is accurate (e.g., whether the other mapping correctly identifies corresponding attributes among multiple data structures of different systems 230). In some implementations, source system 230 may trigger an alarm, send a message to a user device 210, and/or the like to indicate whether a mapping is accurate.

In this way, source system 230 may provide data toward the destination system 230 prior to performing an action.

As further shown in FIG. 4, process 400 may include performing an action related to the data provided to the destination system using the data lineage record (block 440). For example, source system 230 may perform an action related to the data provided toward the destination system 230 using the data lineage record.

In some implementations, source system 230 may generate a report that identifies a mapping of the first data structure associated with the source system 230 and the second data structure associated with destination system 230. Additionally, or alternatively, source system 230 may output a report for display after generating the report. Additionally, or alternatively, source system 230 may receive a request to perform analytics on, to query, to analyze, and/or the like a subset of data in a data structure associated with the source system 230 or the destination system 230. In this case, in some implementations, the source system 230 may identify a data lineage record in the subset of data (e.g., based on an identifier included in the data lineage record that identifies the data lineage record), and may remove (or exclude) the data lineage record from the subset of data on which analytics are to be performed, which is to be queried, which is to be analyzed, and/or the like. This reduces a likelihood of a data lineage record being included in a subset of data, which may consume processing resources by generating an error when the subset of data is processed.

In some implementations, source system 230 may track data through one or more systems 230 using a data lineage record. For example, source system 230 may track unique values of the data lineage record as the data lineage record is exchanged with data among various systems 230. Additionally, or alternatively, and as another example, source system 230 may track an identifier related to the data lineage record as the data lineage record is included in data structures of various systems 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
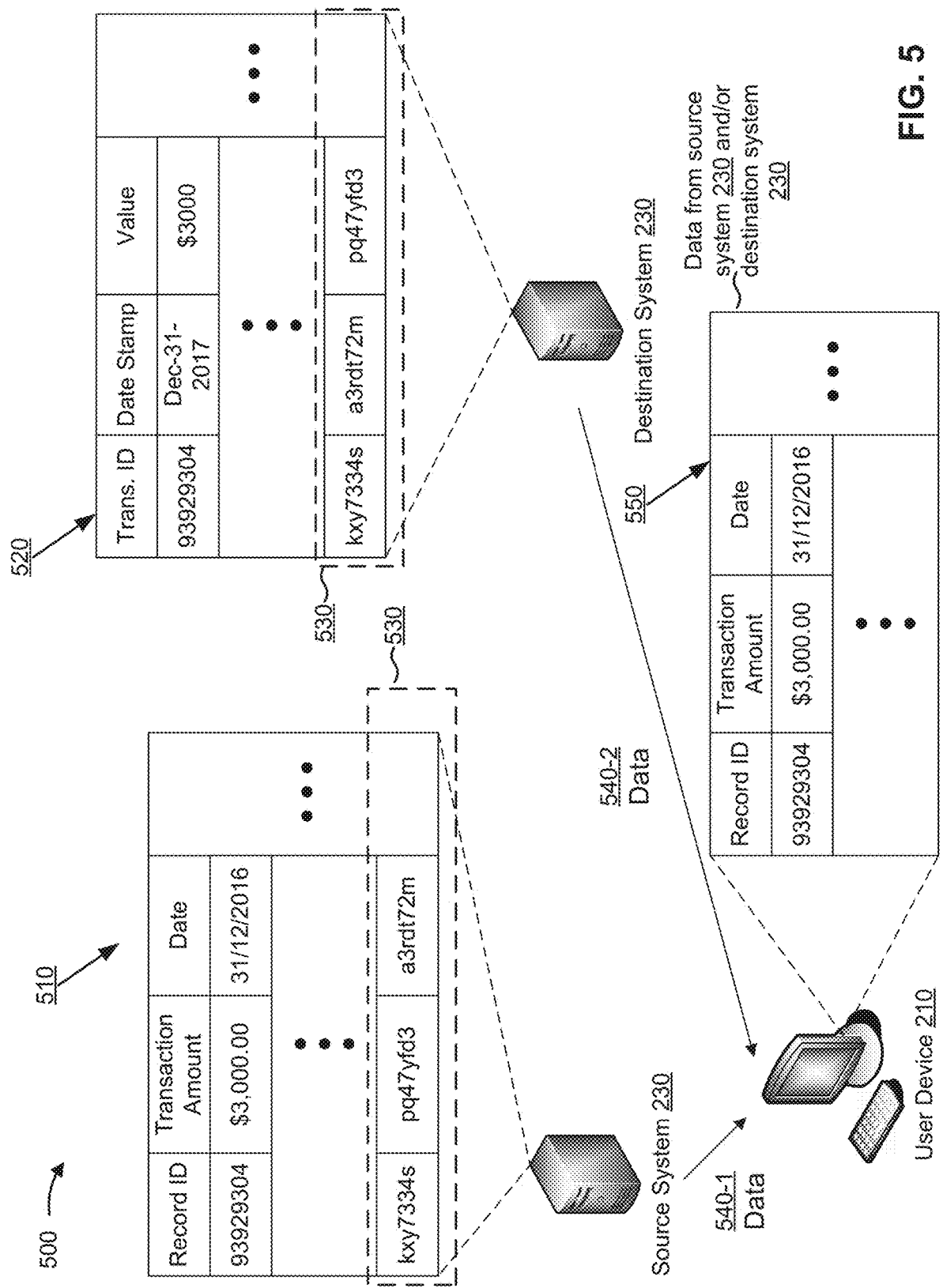
FIG. 5 is a diagram of an example implementation relating to the example process shown in FIG. 4.

FIG. 5 is a diagram of an example implementation 500 related to example process 400 shown in FIG. 4. For example, FIG. 5 shows an example of using a data lineage record to provide a consistently configured visualization of data for display, regardless of the configuration of the data structure in which the data is stored. As shown in FIG. 5, implementation 500 includes a user device 210, a source system 230, and a destination system 230.

As shown by reference number 510, the source system 230 may store various records that include data. As further shown, the data of the records may have a particular format (e.g., a $xxx.xx format for a monetary value). In addition, attributes of the records may have particular identifiers (e.g., shown as "Record ID," "Transaction Amount," and "Date"). Assume for FIG. 5 that the source system has provided the data shown by reference number 510 to the destination system 230. As shown by reference number 520, the destination system 230 may store the data from the source system 230. However, as further shown by reference number 520, the data may have a different format than the data stored by the source system 230 (e.g., a $xxx format for a monetary value). In addition, the attributes of the records stored by the destination system 230 may have different identifiers than the attributes of the records stored by the source system 230 (e.g., shown as "Trans. ID," "Date Stamp," and "Value"). As shown by reference number 530, the data stored by the source system 230 and the destination system 230 may both include a data lineage record (e.g., generated by the source system 230 and provided to the destination system 230).

As shown by reference numbers 540-1 and 540-2, the source system 230 and the destination system 230 may provide data to user device 210 for display (e.g., data from the source system 230 and/or the destination system 230). In some implementations, the data may include the data lineage record. As shown by reference number 550, user device 210 may provide data from source system 230 and/or destination system 230 for display. As further shown, regardless of the particular system 230 that provided the data for display, user device 210 may be capable of applying a consistent formatting to the data, using consistent identifiers for attributes, and/or the like using the data lineage record. For example, user device 210 may map attributes of data from the source system 230 and attributes of data from the destination system 230 and may select attribute identifiers, a formatting, and/or the like to use when providing data from either source system 230 and/or destination system 230 for display.

In some implementations, source system 230 and/or destination system 230 may perform the mapping and selection of attribute identifiers, formatting, and/or the like and may provide a set of instructions to user device 210 to cause user device 210 to provide data for display using the attribute identifiers, with the formatting, and/or the like. In this way, a data lineage record improves a visualization of data, reduces or eliminates confusion that results from accessing the same data in different systems (e.g., when the different systems use different formats, use different attribute identifiers, etc.), and/or the like. In addition, this conserves computing resources of user device 210 by providing data in a format expected by the user, thereby reducing or eliminating a need for the user to have to reformat the data.

As indicated above, FIG. 5 is provided merely as an example. Other examples are possible and may differ from what was described with respect to FIG. 5.

Figure 6:
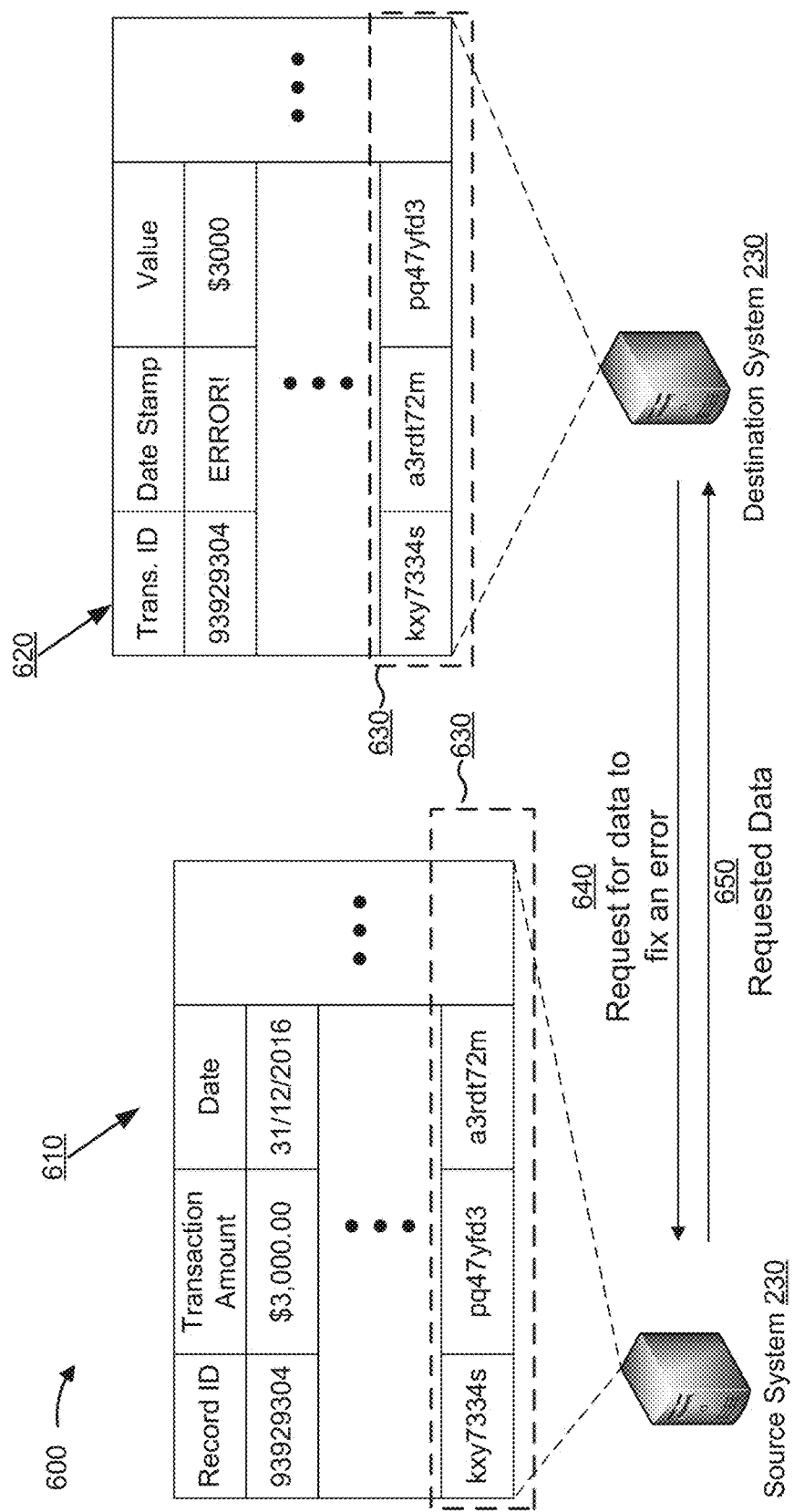
FIG. 6 is a diagram of another example implementation relating to the example process shown in FIG. 4.

FIG. 6 shows a diagram of an example implementation 600 related to example process 400 shown in FIG. 4. For example, FIG. 6 shows an example of using a data lineage record to fix an error in data. As shown in FIG. 6, implementation 600 includes a source system 230 and a destination system 230.

As shown by reference numbers 610 and 620, the source system 230 and the destination system 230 may store data in a manner similar to that described with respect to reference numbers 510 and 520. In addition, as shown by reference numbers 630, the source system 230 and the destination system 230 may store a data lineage record in a manner similar to that described above with respect to reference numbers 530. Assume for FIG. 6 that the source system 230 has mapped data stored by the source system 230 (e.g., shown by reference number 610) and data stored by the destination system 230 (e.g., shown by reference number 620). Further, assume for FIG. 6 that the data stored by the destination system 230 contains an error (e.g., is missing, is corrupted, etc.). For example, particular data elements for particular attributes, rather than all the data, may contain errors.

As shown by reference number 640, the destination system 230 may provide, to the source system 230, a request for data to fix an error. For example, the destination system 230 may identify a data element that contains an error and may provide the request to the source system 230 after identifying the error-containing data element. In some implementations, the destination system 230 may identify a value of a data lineage record that corresponds to an attribute that contains an error. In the example shown in FIG. 6, the data lineage record does not include an error and can be used to request a correct value for the error-containing attribute. In other examples, the data lineage record may include an error, such as when the error is the result of a processing error of system 230. In this case, system 230 may process code, such as a structured query language (SQL) statement that inserted the data into a data structure of system 230, to identify a correct value of the data lineage record to facilitate a request for a correct value of an error-containing attribute of another record in the data structure.

For example, and as shown in FIG. 6, a data element for a date stamp attribute of record 93929304 may include an error. Continuing with the previous example, the destination system 230 may identify value a3rdt72m as corresponding to same attribute as the data element that includes the error. In some implementations, destination system 230 may provide information identifying the value corresponding to the error-containing data element to source system 230.

In some implementations, the source system 230 may identify a data element in data stored by the source system 230 that corresponds to the data lineage record value. For example, source system 230 may identify 31/12/2016 as the data element of the record in source system 230 by identifying the attribute that corresponds to the attribute value a3rdt72m from the data lineage record. As shown by reference number 650, the source system 230 may provide, to the destination system 230, the requested data to fix the error. For example, the source system 230 may provide information identifying 31/12/2016 as the data element needed to fix the error-containing data. In this way, a data lineage record may facilitate quick and/or easy recovery of error-containing data, thereby reducing latency related to recovery of data, conserving network resources by reducing an amount of data that source system 230 needs to provide to recover data, and/or the like.

As indicated above, FIG. 6 is provided merely as an example. Other examples are possible and may differ from what was described with respect to FIG. 6.

One or more of the functions of the implementations described herein apply equally to a source system 230, a destination system 230, and/or another system 230, regardless of the manner described herein.

In this way, system 230 may facilitate mapping of a first data structure and a second data structure via generation of a data lineage record. This improves determination of a data lineage of data by improving an efficiency of determining a data lineage. In addition, this reduces an amount of memory resources needed to store information related to mapping a first data structure and a second data structure, thereby conserving memory resources. Further, this increases an accuracy of determining a data lineage of data, thereby conserving processor resources relative to a less accurate determination of a data lineage of data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   providing, by a destination system configured to use a first data structure and to a source system configured to use a second data structure, information identifying a manner in which a data lineage record was included in the first data structure by the destination system,
   where the information identifying the manner identifies one or more of:
   whether any unique values in the data lineage record were modified from what the source system provided, or
   whether the first data structure includes any attributes that are different from attributes in the data lineage record;

identifying, by the destination system, a data element, of the first data structure, that includes an error;

identifying, by the destination system, a value of the data lineage record that corresponds to a first attribute, of the first data structure, associated with the data element;

providing, by the destination system and to the source system, a request to fix the error,
the request including information identifying the value of the data lineage record; and receiving, by the destination system and from the source system, particular data to fix the error based on providing the request,
the particular data being identified by the source system based on the value of the data lineage record, and
a first name of the first attribute of the first data structure being different from a second name of a second attribute, of the second data structure, associated with the particular data.

2. The method of claim 1, further comprising:
receiving data from the source system,
the data including the data lineage record; and
storing the data, in the first data structure, before identifying the data element that includes the error.

3. The method of claim 2,
where the data is stored in a first format by the source system,
where the data is stored in a second format by the destination system, and
where the second format is different from the first format.

4. The method of claim 1, where the data lineage record is used to provide a consistent visualization of the data for display.

5. The method of claim 1, where the information identifying the manner identifies whether all or a portion of the data lineage record was included in the first data structure.

6. The method of claim 1,
where the first name corresponds to the value in the first data structure, and
where the second name corresponds to the value in the second data structure.

7. The method of claim 1,
where the attributes in the first data structure include the first attribute,
where the attributes in the data lineage record include the second attribute, and
where the information identifying the manner identifies that the first data structure includes the first attribute that is different from the second attribute that is included in the data lineage record.

8. A destination system, comprising:
one or more memories; and
one or more processors communicatively coupled to the one or more memories, configured to:
provide, to a source system, information identifying a manner in which a data lineage record was included in a first data structure by the destination system,
where the information identifying the manner identifies one or more of:
whether any unique values in the data lineage record were modified from what the source system provided, or
whether the first data structure includes any attributes that are different from attributes in the data lineage record;
identify a data element, of the first data structure, that includes an error;

identify a value of the data lineage record that corresponds to a first attribute, of the first data structure, associated with the data element;
provide, to the source system, a request,
the request including information identifying the value of the data lineage record; and
receive, from the source system, particular data based on providing the request,
the particular data being identified by the source system based on the value of the data lineage record, and
a first name of the first attribute of the first data structure being different from a second name of a second attribute, of a second data structure used by the source system, associated with the particular data.

9. The destination system of claim 8, where the one or more processors are further configured to:
receive data from the source system,
the data including the data lineage record; and
store the data, in the first data structure, before identifying the data element that includes the error.

10. The destination system of claim 9,
where the data is stored in a first format by the source system,
where the data is stored in a second format by the destination system, and
where the second format is different from the first format.

11. The destination system of claim 8, where the data lineage record is used to provide a consistent visualization of the data for display.

12. The destination system of claim 8,
where the first name corresponds to the value in the first data structure, and
where the second name corresponds to the value in the second data structure.

13. The destination system of claim 8,
where the attributes in the first data structure include the first attribute,
where the attributes in the data lineage record include the second attribute, and
where the information identifying the manner identifies that the first data structure includes the first attribute that is different from the second attribute that is included in the data lineage record.

14. The destination system of claim 8, where the information identifying the manner identifies whether all or a portion of the data lineage record was included in the first data structure.

15. A non-transitory computer-readable medium storing instructions, the instructions comprising:
one or more instructions that, when executed by one or more processors of a destination system, cause the one or more processors to:
provide, to a source system, information identifying a manner in which a data lineage record was included in a first data structure by the destination system,
where the information identifying the manner identifies one or more of:
whether any unique values in the data lineage record were modified from what the source system provided, or
whether the first data structure includes any attributes that are different from attributes in the data lineage record;
identify a data element, of the first data structure, that includes an error;

identify a value of the data lineage record that corresponds to a first attribute, of the first data structure, associated with the data element;
provide, to the source system, a request,
the request including information identifying the value of the data lineage record; and
receive, from the source system, particular data based on providing the request,
the particular data being identified by the source system based on the value of the data lineage record, and
a first name of the first attribute of the first data structure being different from a second name of a second attribute, of a second data structure used by the source system, associated with the particular data.

16. The non-transitory computer-readable medium of claim 15, where the one or more instructions, when executed by the one or more processors, further cause the one or more processors to:
receive data from the source system,
the data including the data lineage record; and
store the data, in the first data structure, before identifying the data element that includes the error.

17. The non-transitory computer-readable medium of claim 15, where the data lineage record is used to provide a consistent visualization of the data for display.

18. The non-transitory computer-readable medium of claim 15, where the information identifying the manner identifies whether all or a portion of the data lineage record was included in the first data structure.

19. The non-transitory computer-readable medium of claim 15,
where the first name corresponds to the value in the first data structure, and
where the second name corresponds to the value in the second data structure.

20. The non-transitory computer-readable medium of claim 15,
where the attributes in the first data structure include the first attribute,
where the attributes in the data lineage record include the second attribute, and
where the information identifying the manner identifies that the first data structure includes the first attribute that is different from the second attribute that is included in the data lineage record.

* * * * *